W. H. SWAN.
Knives for Flock Cutting-Machines.
No. 155,627. Patented Oct. 6, 1874.
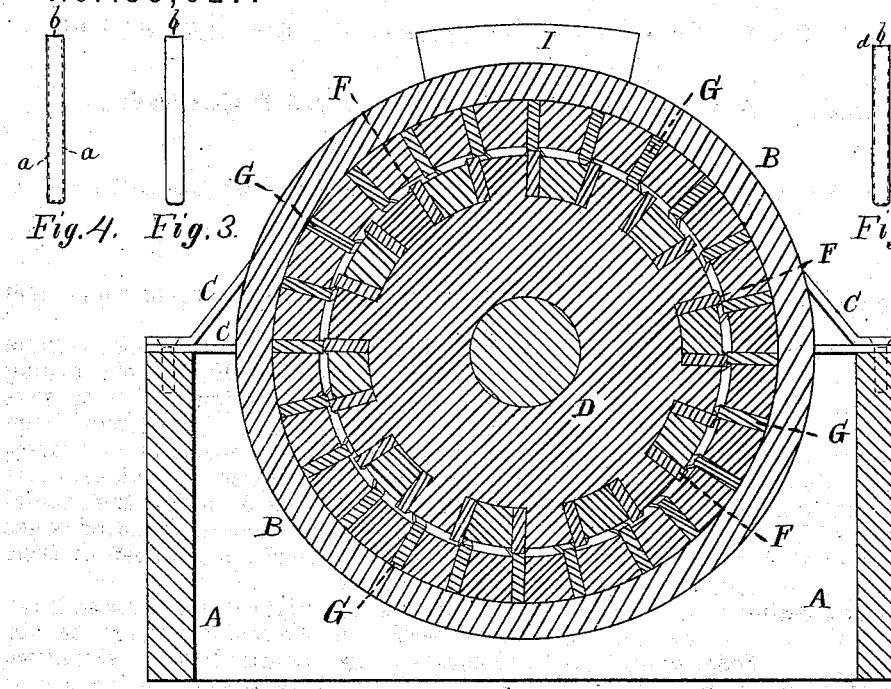
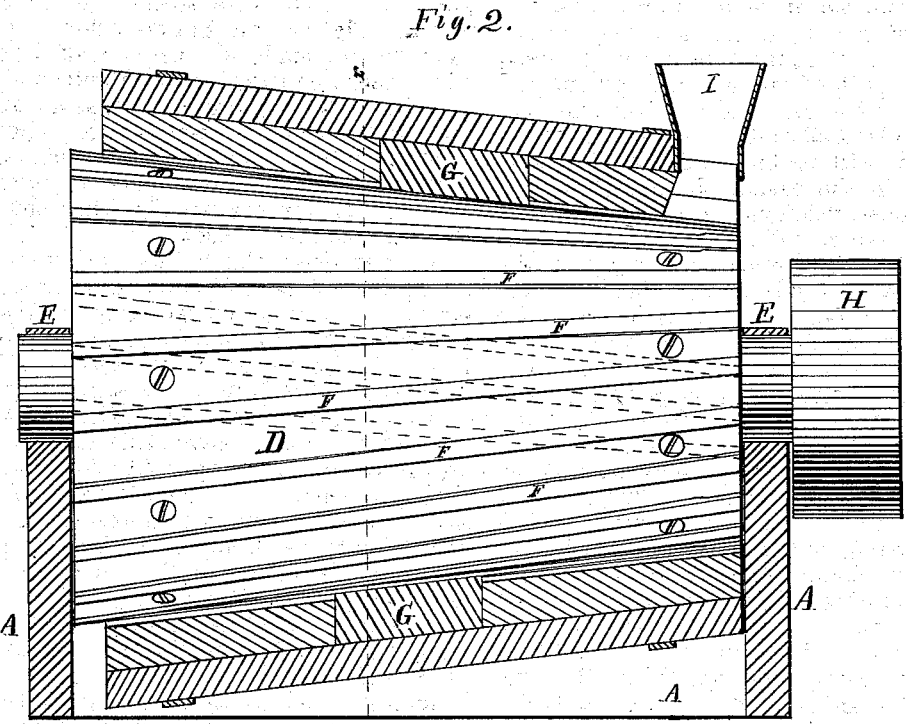

UNITED STATES PATENT OFFICE.

WILLARD H. SWAN, OF SOUTH MILFORD, MASSACHUSETTS.

IMPROVEMENT IN KNIVES FOR FLOCK-CUTTING MACHINES.

Specification forming part of Letters Patent No. 155,627, dated October 6, 1874; application filed August 19, 1874.

*To all whom it may concern:*

Be it known that I, WILLARD H. SWAN, of South Milford, in the county of Worcester and State of Massachusetts, have invented a new and useful Improvement in Knives for Flock-Cutting Machines, of which the following, taken in connection with the accompanying drawings, is a specification:

In machines for cutting flock, as usually constructed, a series of knives are arranged spirally around a conical drum mounted in suitable bearings, so as to revolve within a correspondingly-conical casing, around the interior periphery of which is arranged another series of knives, spiral or inclined, to the axis of said casing, but in a direction opposite to the spiral of the knives on the drum. These knives are plain square-edged bars of steel, about one-eighth of an inch thick by one and one-fourth to one and one-half inch wide, set edgewise and radially into the drum and casing.

The drum, with its knives thereon, is placed in position in the casing, the knives having been previously fitted and secured to the interior of the casing, and the two sets of knives are then ground together with emery, in the same manner that valves and plug-cocks are ground to their seats, so that every knife in the drum shall fit perfectly to every knife in the casing. This is a laborious and expensive operation, but one that has to be performed several times every day upon all flock-cutting machines not provided with my improvement.

Prior to my invention, a machine, under the most favorable circumstances, using the best of stock, would cut only about two hundred and fifty pounds of flock before it would have to be ground again, the average being only about two hundred pounds to a grinding, and a large portion of that amount would not be cut but jammed off or pulled apart, and as a consequence made very poor flock. This result was due entirely to the composition of the knives, which being of the same consistency all through, the effect of passing gritty waste through the machine to cut it into flock was to wear away the cutting corner of the knife very quick and round it over, so that instead of cutting the fiber it would simply jam it off or pull it apart.

To obviate this difficulty and make a knife that will be comparatively self-sharpening is the object of my invention; and it consists in the use, in combination with a conical drum and inclosing casing, of two series of knives, arranged spirally in opposite directions, made from soft iron, with one or both of their radial faces case-hardened, while their outer edges between said hardened films are left in their original soft state.

In the drawings, Figure 1 is a vertical longitudinal section of the casing through its axis, and showing the conical drum in elevation. Fig. 2 is a transverse section on line $x \, x$ on Fig. 1. Fig. 3 is an end elevation of the ordinary knife, made of steel, in cutting order. Fig. 4 represents my improved knife under the same conditions. Fig. 5 represents an end view of the ordinary steel knife as it becomes after cutting two hundred and twenty pounds of flock, and Fig. 6 represents my improved knife as it appears after having cut three thousand pounds of flock.

A A represent the frame, upon which the casing B is supported by means of the brackets C C. D is a conical drum, mounted in suitable bearings E upon the frame A, concentric with the casing B, as shown. F F are the knives of the drum D, set in radial grooves running slightly spiral to its axis, and projecting a short distance beyond its surface. G G are corresponding knives set in like manner in the inner periphery of the casing B, all fitted and secured in position in a well-known manner. The knives F and G are thin flat bars of soft iron, having one or both of their radial faces case-hardened, so as to form a thin hard scale upon the cutting corner of each knife, while the remaining portion is left in its natural or soft state.

Some flock-machines are constructed to run in either direction, and for such machines the knife should have both radial faces case-hardened; but if the machine is to be run only in one direction the knives need be hardened only upon one side.

My improved knife is shown in Fig. 4, where the case-hardening is indicated by the dotted lines $a\,a$, the cutting-edge of the knife being at $b$, which is ground to a true even surface, removing all hard scale from the center portion of the knife, so that the soft metal may come to wear.

I am aware that knives have been used made from soft iron with a thin plate of steel welded to their radial faces; but as the plate of steel must be of considerable thickness, say about one sixteenth of an inch, in order to weld it to the iron without burning it up, no better result has been obtained with this knife than with the solid steel one, the result of a few minutes' use being in every case to round over the cutting corner of the knives, as seen in Fig. 5, at $c$, after cutting about two hundred pounds of flock; while with my improved knife (shown ready for use in Fig. 4, and, after cutting three thousand pounds of flock without grinding, in Fig. 6) no grinding would be necessary till the knife was worn out if it were not necessary to readjust the knives occasionally to compensate for the wear, and on account of occasional accidents caused by some hard substance passing through the machine and injuring the knives, they being self-sharpening on account of the action of the gritty substances upon the soft metal of the contiguous edges of the knives, which cuts it away faster than it does the hard scale at the cutting corner, which leaves the knife in the condition shown in Fig. 6, with the hardened corners at $d\,d$ higher than the soft metal between.

A certain degree of compensation for the wear of the knives is obtained by moving the conical drum D toward the small end of the casing B by means of a set-screw acting against the end of the drum-shaft in a well-known manner, and therefore not shown in the drawings.

H is the driving-pulley, and I the hopper, through which the material is fed to the cutters in a well-known manner.

What I claim as new, and desire to secure by Letters Patent of the United States, is as follows:

In a machine for cutting flock, a knife made of soft iron, with one or both of its sides case-hardened, so as to form a thin hard scale at the cutting corner or corners, while the bulk or larger part of the knife at the cutting-edge is left in its original soft state, substantially as described.

Executed at Boston this 15th day of August, 1874.

WILLARD H. SWAN.

Witnesses:
WM. P. EDWARDS,
N. C. LOMBARD.